INVENTORS
HAROLD E. ROSENBERGER
SARKIS K. TCHEJEYAN
BY Frank C. Parker
ATTORNEY

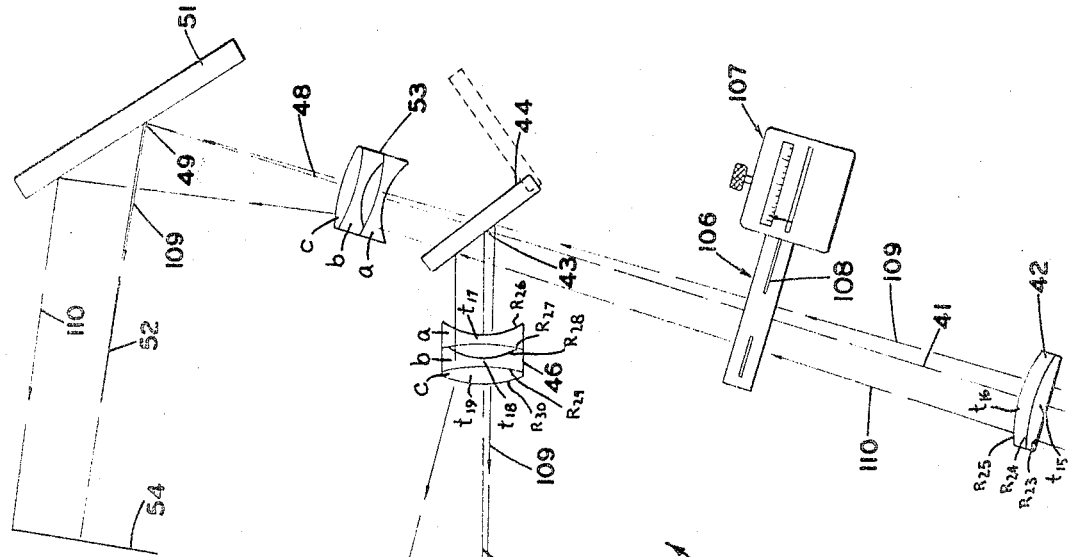
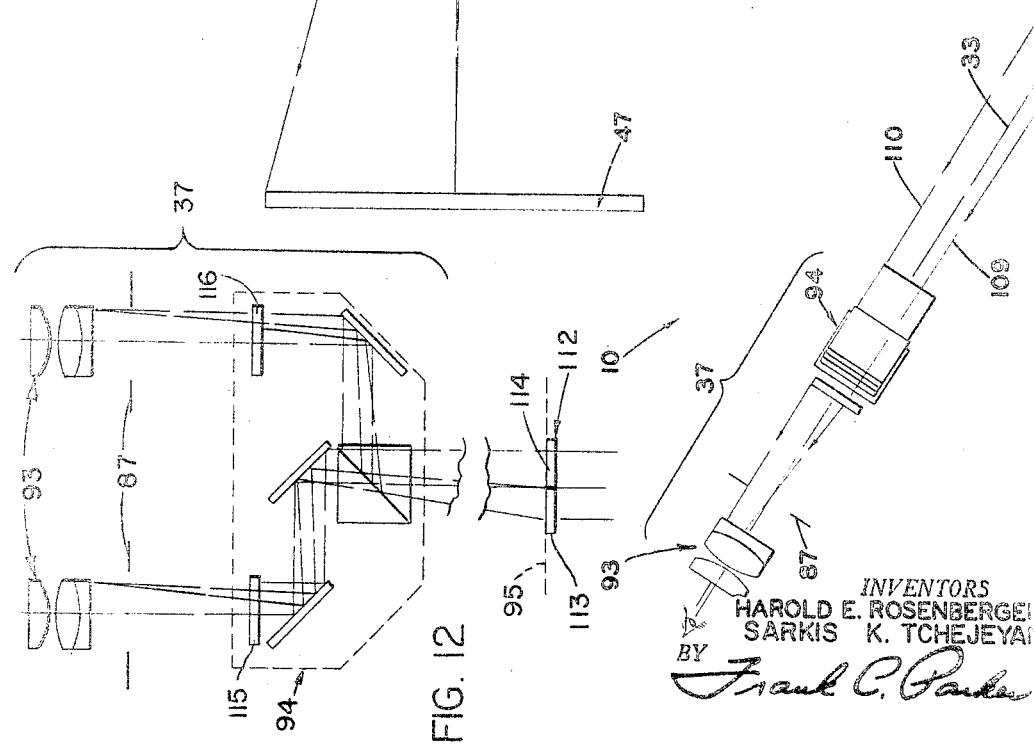
FIG. 2
FIG. 12
INVENTORS
HAROLD E. ROSENBERGER
SARKIS K. TCHEJEYAN
BY Frank C. Parker
ATTORNEY

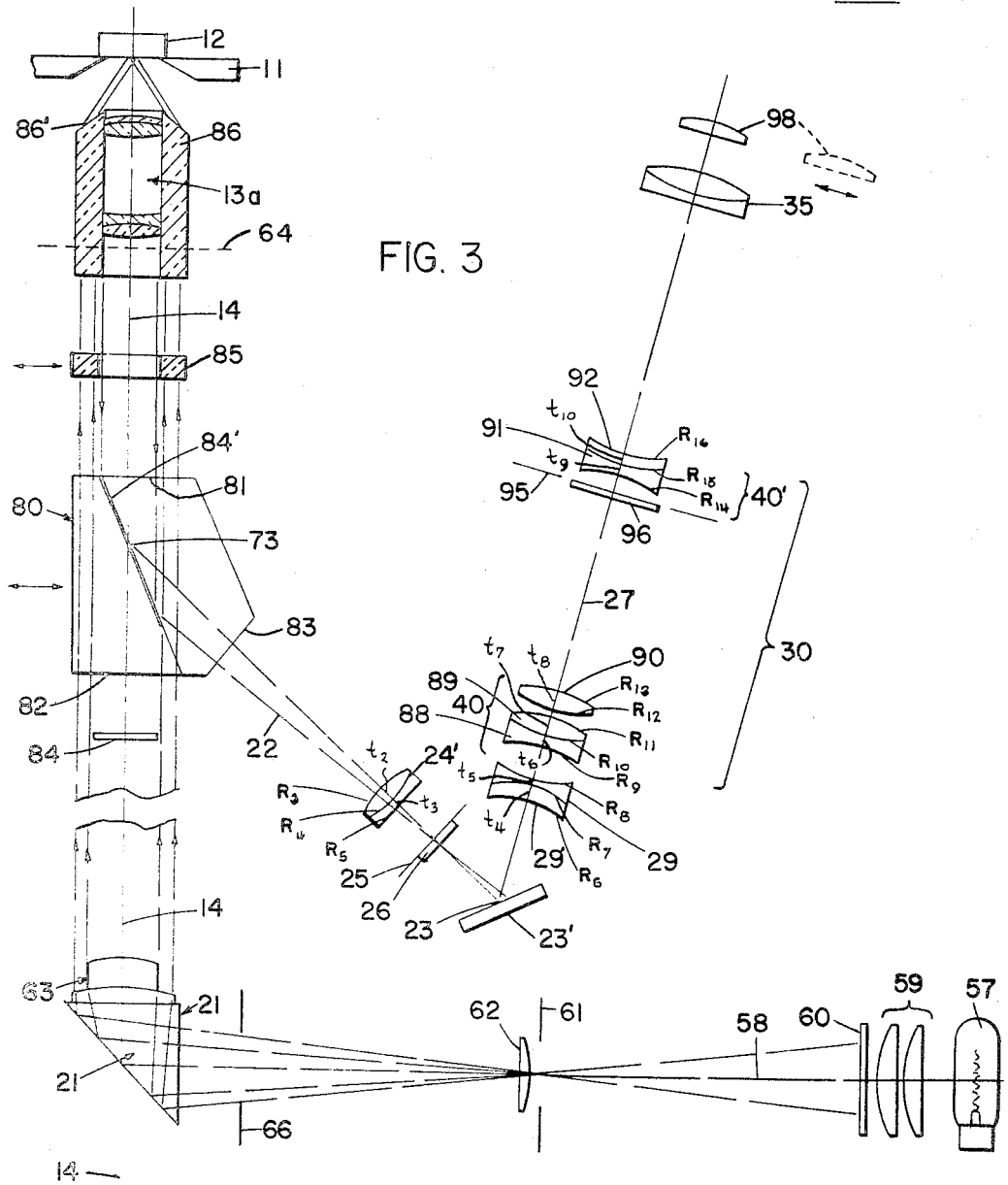
FIG. 3
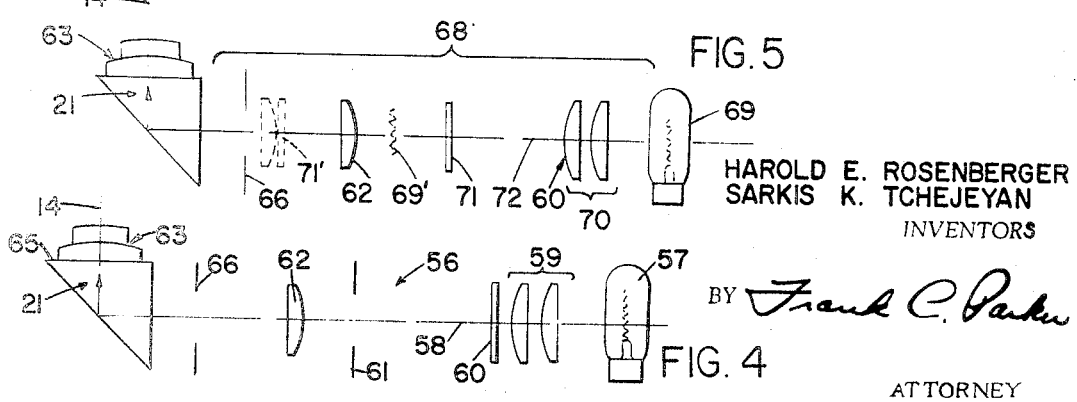
FIG. 5
FIG. 4
HAROLD E. ROSENBERGER
SARKIS K. TCHEJEYAN
INVENTORS
BY Frank C. Parker
ATTORNEY

FIG. 6
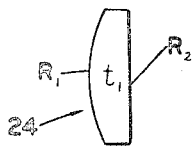
FIG. 7
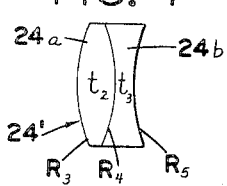
FIG. 8
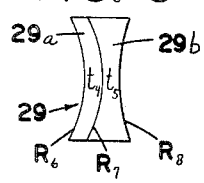
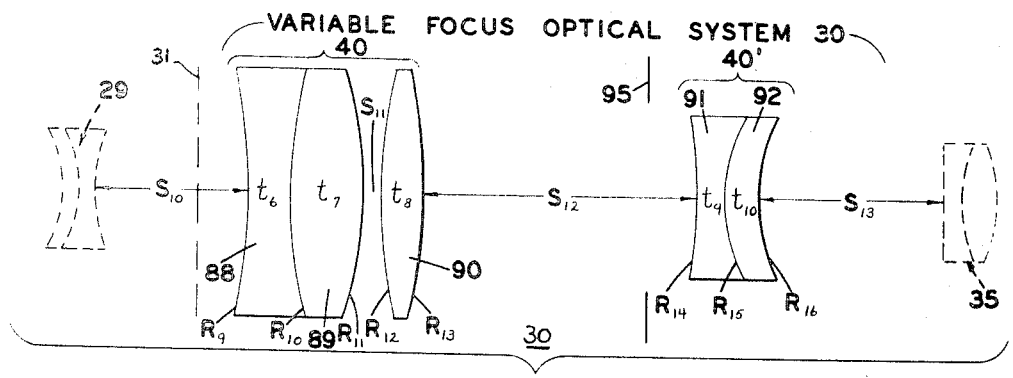
FIG. 9
| VARIABLE FOCUS LENS SYSTEM 30 | | | | |
|---|---|---|---|---|
| LENS | RADII | THICKNESS | $n_D$ | $\nu$ |
| 88 | $R_9 = -0.823F$ | $t_6 = 0.012F$ | 1.720 | 29.3 |
|  | $R_{10} = 0.175F$ |  |  |  |
| 89 | $R_{11} = -0.175F$ | $t_7 = 0.036F$ | 1.498 | 67.0 |
| 90 | $R_{12} = 0.249F$ | $t_8 = 0.021F$ | 1.517 | 64.5 |
|  | $R_{13} = -0.304F$ |  |  |  |
| 91 | $R_{14} = -0.235F$ | $t_9 = 0.012F$ | 1.517 | 64.5 |
|  | $R_{15} = 0.075F$ |  |  |  |
| 92 | $R_{16} = 0.126F$ | $t_{10} = 0.015F$ | 1.720 | 29.3 |
FIG. 10
| LENS SPACING OF LENS SYSTEM 30 | | | | |
|---|---|---|---|---|
| MAGNIF. FACTOR | $S_{10}$ | $S_{11}$ | $S_{12}$ | $S_{13}$ |
| 1.2 | 0.143 F | 0.0014 F | 0.088 F | 0.557 F |
| 1.8 | 0.149 F | " | 0.164 F | 0.475 F |
| 2.0 | 0.136 F | " | 0.224 F | 0.427 F |
| 3.0 | 0.125 F | " | 0.274 F | 0.389 F |
| 3.6 | 0.116 F | " | 0.317 F | 0.355 F |
| 4.8 | 0.104 F | " | 0.389 F | 0.295 F |
| 7.2 | 0.088 F | " | 0.504 F | 0.196 F |
FIG. 11

3,437,395
OPTICAL SYSTEM FOR INVERTED
MICROSCOPE
Harold E. Rosenberger, Brighton, N.Y., and Sarkis K. Tchejeyan, Cudahy, Wis., assignors to Bausch & Lomb Incorporated, Rochester, N.Y., a corporation of New York
Filed Sept. 3, 1965, Ser. No. 484,986
Int. Cl. G02b 23/02, 21/18, 7/04
U.S. Cl. 350—9
9 Claims

ABSTRACT OF THE DISCLOSURE

An optical system for a microscope, particularly but not exclusively of the inverted type, incorporating image modifying effects and photographic apparatus. The optical system includes a zoom optical subsystem having a positive front lens component and a rear negative lens component to achieve a greater range of magnefication. A movable phase retardation plate is located between the zoom subsystem lens components and is spaced at a constant distance from the first positive lens component.

---

This invention relates to a microscope and more particularly it relates to the optical system of a microscope of the inverted or metallographic type and to improvements therein.

Because of the expanding development of metallurgical technology, the need for a commensurate development in microscope apparatus is evident whereby a complete and thorough inspection and investigation of metallurgical specimens of various kinds may be expeditiously conducted by the use of a single instrument.

In view of this need, it is an object of the present invention to provide an optical system for a novel inverted or metallographic type of microscope which is versatile in use to meet new advances in metallurgical technology, is capable of high-grade optical and mechanical performance, and wherein conversion from one condition of operation to another may be accomplished quickly and easily without the use of tools.

It is a further object of this invention to provide such a device having capabilities in a single instrument of using a plurality of so-called auxiliary devices such as binocular vision, phase contrast equipment, tint plate and retardation plate equipment as well as polarization and comparison equipment together with such other equipment as diaphragming and photographic mechanism.

A still further object of this invention is to provide such a device wherein the image may be continuously varied in magnification through a relatively large range of powers by a zoom optical system so that it is unnecessary to employ a plurality of eyepieces of different specific powers to change the magnification of the image.

Another object of this invention is to provide an improved optical system for a metallurgical microscope wherein lateral color aberrations may be internally controlled and compensated without changing eyepieces, and various comparison indicia may be introduced into the optical system to enhance the variety and scope of the operational capabilities of the instrument.

A further object of this invention is to provide such a device which incorporates means whereby various functional members of the optical system cooperatively produce phase contrast effects in connection with the use of a zoom type of variable magnification optical system, said means further including elements for testing the axial alignment of said members and determining conditions of conjugacy thereof.

Further objects and advantages will be apparnet in the arrangement and combination of parts of the optical system and in the detailed structure thereof, the invention being described in the specification hereinbelow and shown in the accompanying drawings, wherein:

FIG. 2 is an optical diagram showing the contiguous upper part of the optical system of the inverted microscope shown in FIG. 1, these two figures being used in conjunction with each other to illustrate the entire microscope optical system;

FIG. 3 is a schematic view of said optical system adapted to dark field illumination;

FIG. 4 is a schematic view of one form of illumination system for said optical system;

FIG. 5 is a view similar to FIG. 4 showing another form of illumination system;

FIG. 6 is an optical diagram of one form of compensating lens for said optical system;

FIGURE 7 is an optical diagram of another form of compensating lens;

FIG. 8 is an optical diagram showing a field lens in said optical system;

FIG. 9 is an optical diagram showing a variable focus optical system which is comprised in said optical system;

FIG. 10 is a chart giving the constructional data for the variable focus lens system;

FIG. 11 is a chart giving further constructional data for the variable focus lens system; and FIG. 12 is a diagrammatic view showing a stereo viewing device forming a part of said optical system.

Figure 1:
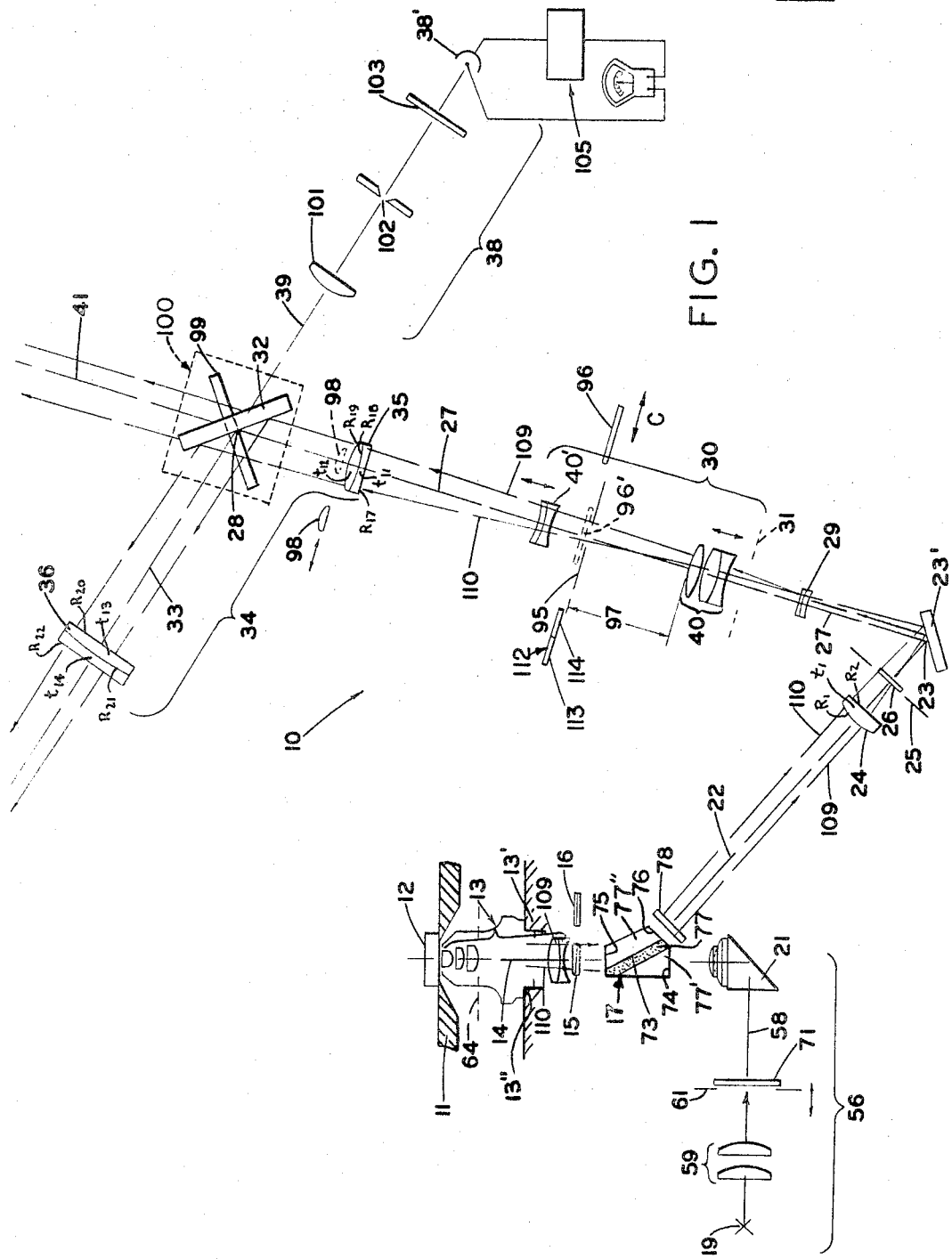
FIG. 1 is an optical diagram showing the lower portion of the optical system of an inverted or metallurgical microscope incorporating the novel structure of our invention.

The general arrangement of the aforesaid inverted or metallographic type of microscope is designated by the numeral 10, said microscope comprising a stage 11 whereon a specimen 12 is held. Beneath the stage 11 a microscope objective 13 is mounted in a fixed frame member 13′ in alignment with a vertical portion 14 of the optical axis of the optical system, said objective being focused upon the specimen 12. Beneath the objective 13 is optically aligned one of a plurality of light modifying devices such as a tint plate 15 or quarter-wave plate 16. A beam divider 17 is arranged in the vertical optical axis portion 14 beneath said tint plate 15 in a position such that it receives on one of its surfaces 74 a bundle of illumination rays from a light source 19 by way of a deviation prism 21. The illumination means is described hereinafter. Said beam divider 17 is provided with an interface 73 so as to deviate the image rays which are reflected from the specimen along a second axis portion 22 which extends rearwardly and downwardly from the beam divider to a fixed point 23 thereon.

Between the beam divider 17 and the fixed point 23 is arranged a color compensating field lens 24 of weak positive power which focuses the image rays at a stationary image plane 25. The compensation lens is described more in detail hereinafter.

At the image plane 25, a reticle plate 26 as described hereinafter is positioned so that the image of the specimen is formed upon the surface of the plate. Said image and reticle plate 26 are imaged together by subsequent optical means in the eyepiece focal plane or on a viewing screen or film. At the fixed point 23, a flat or plane mirror 23′ is positioned in such an angular relation to the second axis portion 22 that the reflected image rays are directed along a third axis portion 27 to a second fixed point 28 so that the third axis portion inclines preferably somewhat rearwardly of a vertical position. Upwardly along the third axis portion is positioned an achromatic field lens 29 in optical alignment with the color compensating lens 24 and separated therefrom by an axial distance between .400 L and .480 L wherein L designates the mechanical tube length of the microscope 10 which is here defined as the axial distance between the shoulder 13″ on the frame member 13′ and the image plane 25. Lens 29 is so arranged and constructed that together with said lens 24 or 24′, the principal rays which are projected rearwardly therefrom are substantially collimated. Contributing to such a condition, the equivalent focal length of the lens 29 is specified in the range —.210 L to —.256 L and ideally is —.233 L. Lens 29 is described more in detail hereinafter. The minus (—) sign means negative focal length.

Located next rearwardly of said field lens 29 is a zoom type of continuously variable magnification or pancratic optical system designated by the numeral 30 which will be described more in detail hereinafter. Said variable focus or zoom optical system 30 produces a virtual stationary image 31 which is varied in magnification throughout a comparatively large range of magnification factors between 1.2× and 7.2× by zoom system 30 per se.

At the second fixed point 28 on the third axis portion 27 is arranged a plane mirror 32 which is suitably filmed to be totally reflecting and is inclined to said axis in such a manner as to direct the image rays forwardly and upwardly toward the stage 11 along a fourth axis portion 33. Optically arranged and spaced on the third and fourth axis portions is an erecting lens system which is generally designated by the numeral 34, said erector lens system comprising two positive lenses 35 and 36 located on the third and fourth axis portions respectively. Said erector lens 35 projects the stationary image 31 to the mirror 32 where it is deviated through the erector lens 36 and emerges therefrom reversed and reverted, said image being formed in the eyepiece plane of an eyepiece 37 which is optically aligned therewith. The erector lens system 34 is described in detail hereinafter.

For the purpose of obtaining indication of actinic strength of the image rays, a light sensing device generally indicated by a numeral 38 is provided in optical alignment with the eyepiece 37 on an extension 39 of the fourth axis portion which is produced from the second fixed point 28 in a direction opposite to the axis portion 33, all of which is described more in detail hereinafter.

On a fifth optical axis portion 41, which is coextensive with the third axis portion and extends beyond the second fixed point 28, is arranged a third erector lens 42, this lens being a duplicate of erector lens 36 and serving the same purpose so that at the viewing screen surface 47 or photosensitive screen 54 an erect and unreverted image is formed. The mirror 32 is movable out of the path of the beam which is projected by lens 35 so that said beam may be projected beyond the mirror along axis 41. By lens 42, the image rays are projected along said axis portion 41 to a third fixed point 43.

At the third fixed point 43 on the fifth axis portion 41 is arranged a plane mirror 44 which is so inclined as to deviate the incident image rays forwardly in the direction of the stage, along a sixth axis portion 45. The image rays which are deviated by the plane mirror 44 are diverged by an amplifier lens 46 which is optically aligned on axis portion 45 and there is provided in optical alignment therewith a viewing screen 47 which is located in the focal plane formed by the amplifier lens 46 so that an erect enlarged image is formed on said screen. It will be noticed in FIG. 2 that the viewing screen is located higher than either the stage 11 or the eyepiece 37 and is situated in position to be easily viewed by an operator.

The fifth axis portion 41 is produced coextensively from the third axis portion 27 beyond the mirror 44 along a seventh axis portion 48 to a fourth fixed point 49 whereat a plane mirror 51 is located. It will be understood that mirror 44 may be moved to its inoperative position shown in dotted lines so as to allow the image rays to pass along axis portion 48. The mirror 51 is so inclined with respect to the seventh axis portion 48 as to deviate the incident image rays forwardly along an eighth axis portion 52 which is directed laterally toward the stage. Optically aligned between the plane mirrors 44 and 51 and located at the same axial distance away from point 43 as the first amplifier lens 46 is located a second amplifier lens 53 which is a substantial duplicate thereof. Said second amplifier lens 53 forms an erect enlarged image at a film plane 54 whereat a suitable film holder, not shown, may be held.

The axial distance between the erector lens 42 and either of the amplifier lenses 46 or 53 is the same and has a value which lies between 1.058L and 1.294L and ideally is 1.176L.

Constructional data for the aforesaid amplifier lenses 46 and 53 are the same and are given in the table of values given herebelow wherein $R_{26}$ to $R_{30}$ represent the successive radii of the lens surfaces, $t_{17}$ to $t_{19}$ represent the axial thicknesses of the successive lens elements $a$, $b$, and $c$, $0.139L < -R_{26} < 0.160L$ } Lens element $a$
$0.139L < R_{27} < 0.160L$
$0.100L < -R_{28} < 0.122L$ } Lens element $b$
$0.228L < R_{29} < 0.278L$
$0.228L < -R_{30} < 0.278L$ } Lens element $c$ $0.0096L < t_{17} < 0.0118L$ Lens element $a$
$0.0096L < t_{18} < 0.0118L$ Lens element $b$
$0.0251L < t_{19} < 0.0307L$ Lens element $c$ $1.536 < n_D$ Lens element $a < 1.546$
$1.536 < n_D$ Lens element $b < 1.546$
$1.715 < n_D$ Lens element $c < 1.725$ $55.0 < \nu$ Lens element $a < 65.0$
$55.0 < \nu$ Lens element $b < 65.0$
$25.0 < \nu$ Lens element $c < 35.0$ wherein $n_D$ and $\nu$ represent the refractive index and Abbé number respectively of the glass. More specifically, the values of the constructional data for the elements $a$, $b$, and $c$ in the lenses 46 and 53 are given substantially in the consolidated table herebelow wherein the symbolism remains the same as the above table.

| Lens | Radii | Thicknesses | $n_D$ | $\nu$ |
|---|---|---|---|---|
| Singlet element $a$ | $-R_{26}=0.154L$ <br> $R_{27}=0.154L$ | $t_{17}=0.0107L$ | 1.541 | 59.9 |
| Doublet element $b$ | $-R_{28}=0.111L$ <br> $R_{29}=0.253L$ | $t_{18}=0.0107L$ | 1.541 | 59.9 |
| Doublet element $c$ | $-R_{30}=0.253L$ | $t_{19}=0.0279L$ | 1.720 | 29.3 |

The value for the equivalent focal length of each of the amplifier lenses 46 and 53 lies between 0.114L and 0.140L and ideally should be 0.127L.

*The illumination system—bright field*

Illustrated diagrammatically at a somewhat enlarged scale in FIG. 4 of the drawing is an illumination system which is generally designated by the numeral 56. Said system 56 comprises a suitable light source such as a Xenon lamp 57 which is optically aligned on an illumination axis 58 coaxially with a condenser lens 59 and a heat filter plate 60.

At or near the position on the axis 58 where the light source is focused, an aperture diaphragm 61 is located in such a manner that the diaphragm is evenly filled with light. The axis 58 of the beam intersects the produced vertical axis 14 at a point where the aforesaid deviation prism 21 is located and it deflects the illumination rays vertically through an entrance surface 74 of the beam divider 17 as shown in FIG. 1.

As shown in FIG. 4, a pair of optically aligned projection lenses 62 and 63 is provided for forming an image of the aperture diaphragm 61 at the exit pupil 64 of the objective 13, the lens 62 being aligned on axis 58 and lens 63 being mounted on the exit surface 65 of aforementioned deviation prism 21. Between said lenses 62 and 63 is coaxially located a field diaphragm 66 at an axial position which is conjugate to said specimen surface, the lens 63 being so constructed that in cooperation with the objective 13, an image of said field diaphragm is formed on the aforementioned specimen surface.

Alternatively, various kinds of light sources may be used in the illumination system 56, such as mercury or incandescent lamps of suitable output together with their accompanying condenser lens groups whereby radiation of desired quality and intensity may be provided.

As shown in FIG. 5, a substitute illumination system 68 may be provided for the microscope 10 whereby phase contrast effects may be utilized. Such an illumination system comprises a suitable light source 69 and its associated condenser lenses 70, which forms an image 69' of said source in substantially the same axial position as the aforesaid aperture diaphragm 61. In said system 68, an illuminating annulus plate 71 is located near said image 69' on the axis 72 of the condenser lenses 70. Axis 72 intersects the extended vertical axis 14 at the deflecting mirror surface of the above-described deviation prism 21 which has the aforesaid lens 63 held thereon, these optical elements as well as the lens 62 being the same in FIGS. 4 and 5. A field diaphragm 66 is also provided in FIG. 5.

One of the important features of this invention concerns the means for positioning said illuminating annulus plate 71 at its true conjugate position relative to the exit pupil 64 of the objective which is in use. Because of the fact that objectives which are individually designed for different magnification and numerical aperture ratings have their corresponding exit pupils 64 located at different axial positions, the illuminating annulus 71 is movably mounted for axial motion between its full-line position at 71 and its opposite extreme position 71' shown in dotted lines. In order to effect such an axial adjustment of the illuminating annulus plate 71 over a wide range, the projection lens 62 is mounted for axial movement along axis 72. In all of the conjugate operating positions of the lens 62 and illuminating annulus plate 71, these elements are so located that lenses 62 and 63 together form an image of the illuminating annulus plate 71 in the exit pupil 64 of the objective which is in use.

As shown in FIG. 1 of the drawing, the beam divider 17 is constructed of a plano parallel plate 77 of birefringent material such as calcite with its optic axis normal to the plane of the drawing and two prisms of optical glass 77' and 77" in optical contact with the birefringent plate 77. An entrance surface 74 for the illumination rays is provided parallel to an exit surface 75 therefor and normal to the vertical axis 14, said exit surface also serving as an entrance surface for the image rays reflected from the specimen, said image rays being reflected by the inclined interface 73 through an inclined exit surface 76 along the second axis portion 22. The above-described beam divider, in conjunction with an analyzer plate 78 and other light modifying accessories to be described subsequently, is intended for all modes of microscope observations except dark field, said modes including bright field, polarized light, sensitive tint, phase contrast, and stereoscopic observations.

Dark field illumination

An alternate beam divider 80 is provided for use with dark field illumination, said beam divider being shaped and constructed similarly to beam divider 17 except that it is larger and is made of optical glass as shown in FIG. 3 of the drawing. Similarly to the first-mentioned beam divider 17, beam divider 80 is provided with an entrance and exit surface 81, an illumination entrance surface 82 and an exit surface 83. Located in alignment with the vertical axis 14, an insertable opaque dark field stop 84 is provided adjacent to entrance surface 82, and alternatively the dark field stop is located as shown by the heavy black line 84' on the interface 73 and is in effect a part of the prism 80.

As shown in FIG. 3, a ring-shaped illuminating beam is projected by the optically aligned lenses 62 and 63 to form a collimated beam which passes through only the peripheral zone of lens 63 after deviation by the prism 21. Upwardly of lens 63, the beam is internally diaphragmed by the dark field stop 84 and passes therefrom through the entrance face 82 of prism 80 past the field stop 84' therein. Continuing upwardly the illumination rays are diaphragmed by a removable dark field tube 85 having opaque walls which support a ring of transparent material. From the tube 85 the rays pass through a light conducting tube 86 formed of transparent material which surrounds an objective lens 13a located on axis 14, the exit surface 86' being inclined to reflect the beam onto the specimen 12.

A bundle of imaging rays is formed by the objective lens 13a, said bundle being projected through the non-reflecting interior walls of the dark field tube 85, and being reflected by a mirror surface formed on the dark field stop 84'. Said bundle of rays is focused by the compensating lens 24' at the image plane 25. Subsequently the imaging rays pass through the reticle plate 26, are reflected by the mirror 23' and are refracted by the field lens 29 and zoom lens system 30 in turn on the way to an eyepiece, not shown, in FIG. 3.

Correction means for lateral chromatism

As mentioned heretofore, a color compensation lens 24 is located in the optical system 10 between the beam divider 17 and the fixed point 23 on the second axis portion 22 for the correction of uncompensated lateral chromatism produced by said system and particularly by the objective 13. This advantageous feature is particularly useful in metallographic type of microscopes which employ a plurality of objectives 13 of different focal lengths selectively, the amount of lateral color to be compensated in the various objectives being of different degrees. To meet this condition, a plurality of compensating lenses 24 and 24' are provided, each having residual lateral chromatism of opposite sign to the lateral chromatism of said objective 13, the amount thereof being different in compensating properties from each other. These lenses are held in a suitable turret for easy interchangeability, with the advantage that a favorable compensation of lateral chromatism in the optical system can be provided without resorting to the use of prior art compensating type of eyepieces. Said compensating lenses 24, 24' have an equivalent focal length between 0.354L and 0.432L and are so axially located that both of them are parfocalized with reference to the stationary image plane 25, the symbol L representing the aforementioned mechanical tube length of the microscope 10. The axial distance L between the aforesaid objective mounting shoulder 13 on frame member 13' and said image plane 25 is substantially 0.900F where F represents the equivalent focal length of the objective 13 per se. Comprised in said plurality of lenses is a singlet positive lens 24, FIG. 6, having a relatively small lateral chromatism of a compensatory kind, and a doublet positive lens 24', FIG. 7, having greater lateral chromatism and having the construction of an achromat except that the highest refractive index and dispersion are found in the positive element. Constructional data for the singlet and doublet color compensating lenses 24 and 24' respectively are given in ranges of values in the table herebelow wherein $R_1$ to $R_5$ designate radii of lens surfaces, $t_1$ to $t_3$ represent the axial thicknesses, and $n_D$ and $\nu$ represent the refractive index and Abbé number respectively of the glass.

LENS 24 (0.354L < Equivalent Focus < 0.432L)

| Lens | Radii | Thicknesses | $n_D$ and $\nu$ |
|---|---|---|---|
| Singlet | $0.175L < R_1 < 0.215L$<br>$R_2 < 20.0L$ | $0.025L < t_1 < 0.031L$ | $1.495 < n_D < 1.505$<br>$62.0 < \nu < 72.0$ |

LENS 24' (0.345L < Equivalent Focus < 0.432L)

| Lens | Radii | Thicknesses | $n_D$ and $\nu$ |
|---|---|---|---|
| Element 24'a | $0.269L < R_3 < 0.329L$<br>$0.269L < -R_4 < 0.329L$ | $0.009L < t_2 < 0.011L$ | $1.715 < n_D < 1.725$<br>$25.0 < \nu < 35.0$ |
| Element 24'b | $0.843L < R_5 < 1.031L$ | $0.012L < t_3 < 0.014L$ | $1.515 < n_D < 1.522$<br>$60.0 < \nu < 70.0$ | wherein the minus (−) sign used with the R values signifies lens surfaces which are concave toward entrant light.

A preferred form of the construction of the compensating lens 24 and lens 24' is specified in the tables herebelow where L represents the mechanical tube length of the microscope, $R_1$ to $R_5$ denotes the successive radii of the lens surfaces numbering from the entrant side, and $t_1$ to $t_3$ designate the successive axial lens thicknesses.

LENS 24 (shown in FIG. 6)
E.F.=0.393L
$R_1$=0.196L
$R_2$=Plano
$t_1$=0.028L
$n_D$=1.498
$\nu$=67.0 wherein $n_D$ and $\nu$ designate the refractive index and Abbé number respectively.

The minus (−) sign designates lens surfaces which are concave toward the entrant light.

The constructional data for a preferred form of positive doublet lens 24' is given in a manner similar to lens 24 in the table herebelow.

LENS 24' (shown in FIG. 7)
E.F.=0.393L $R_3=0.299L$
$R_4=-0.299L$ } Lens element 24'a $\{n_D=1.720, \nu=29.3\}$
$R_5=0.37L$ } Lens element 24'b $\{n_D=1.517, \nu=64.5\}$ $t_2$=0.010L Element 24'a
$t_3$=0.013L Element 24'b Next rearwardly of the compensating lens 24 is optically aligned the aforementioned negative field lens 29 which together with the color compensating lens 24 introduces the principal rays coming from the objective 13 into the variable focus optical system 30 in a substantially collimated manner so as to maintain excellent image quality throughout the entire zoom range and a constant eye relief for the observer regardless of the magnification at which said system is operating. Contributory to such conditions, the equivalent focal length of lens 29 should be between −0.210L and −0.256L and should be positioned at a distance between .400L and .480L rearwardly of lens 24. Ideally, the field lens 29 should be spaced at an axial distance of substantially 0.443L away from lens 24.

The values for the constructional data which are related to field lens 29 are given in the table herebelow wherein $R_6$ to $R_8$ represent the radii of the successive lens surfaces, $t_4$ and $t_5$ represent the axial thickness of the lens elements 29a and 29b, and $n_D$ and $\nu$ represent the refractive index and Abbé number respectively of the glass used in said elements.

FIELD LENS 29 (−0.210L < Equivalent Focal Length < −0.256L)

| Lens | Radii | Thicknesses | $n_D$ and $\nu$ |
|---|---|---|---|
| Element 29a | $0.093L < -R_6 < 0.113L$<br>$0.063L < -R_7 < 0.077L$ | $0.008L < t_4 < 0.010L$ | $1.715 < n_D < 1.725$<br>$25.0 < \nu < 35.0$ |
| Element 29b | $R_8 \geq \pm 1.5L$ | $0.004L < t_5 < 0.006L$ | $1.515 < n_D < 1.522$<br>$60.0 < \nu < 70.0$ |

A specific preferred form of field lens 29 for effecting the above-described condition is given in the table of constructional data herebelow wherein the meaning of the symbols is the same as heretofore used.

FIELD LENS 29
E.F.=−0.233L $R_6=-0.103L$
$R_7=-0.070L$ } Lens Element 29a $\{n_D=1.720, \nu=29.3\}$
$R_8=1.752$ } Lens Element 29b $\{n_D=1.517, \nu=64.5\}$ $t_4$=0.009L
$t_5$=.005L

*Zoom type of variable focus optical system for magnification change*

As mentioned hereabove, a zoom type of continuously variable focus optical system generally designated by the numeral 30 is provided as a part of the novel combination which is comprised in the basic structure of microscope 10. The variable focus optical system 30 preferably comprises front and rear groups of lenses which are designated by 40 and 40' respectively, the front group 40 which is located nearest to the objective 13 being positive in power and the other group of lenses 40' being of negative power, the equivalent focal length of the positive group being substantially 1.1 times the equivalent focal length of the negative group. Both groups of lenses are movable axially in a differential manner relative to a fixed point on said axis so as to vary the size of the virtual stationary image 31 which is formed in front of said optical system 30.

Although a variety of forms of continuously variable focus or zoom optical systems may be used in the basic optical combination as a part of this invention, the preferred type is illustrated in FIGS. 1, 3 and 9 of the drawings, and this particular form of optical system is generally shown and described in Patent No. 3,170,984 issued Feb. 23, 1965, to Harold E. Rosenberger and Herbert D. Korones. The operating qualities and constructional data found in the cited patent are substantially the same as shown herein and are similarly effective in producing the aforesaid virtual stationary image 31. The principal difference between the mechanism shown in said patent and the present device concerns the range of magnification, said range in the present device being limited to a factor of 6.0 corresponding to a low power magnification of 1.2× and a high power magnification of 7.2×.

The values for said constructional data in the zoom optical system 30 are given in the table herebelow, wherein said values are given in terms of L as heretofore, as well as a statement of relative focal lengths of the lens components thereof, $$.85L_{40} < L_{40'} < .95L_{40}$$

wherein $F_{40}$ and $F_{40'}$ are the equivalent focal lengths of the front and rear lens components 40 and 40' respectively of the zoom optical system 30 and $R_9$ to $R_{16}$ represent the radii of the successive lens surfaces, $t_6$ to $t_{10}$ represent the axial thicknesses of the successive lens elements 88 and 92 respectively, and $n_D$ and $\nu$ represent the refractive index and Abbé number respectively of the glasses used in said elements, $$0.741L < -R_9 < 0.905L$$
$$0.157L < R_{10} < 0.193L$$
$$0.157L < -R_{11} < 0.193L$$
$$0.224L < R_{12} < 0.274L$$
$$0.274L < -R_{13} < 0.334L$$
$$0.211L < -R_{14} < 0.259L$$
$$0.067L < R_{15} < 0.083L$$
$$0.113L < R_{16} < 0.139L$$

$$0.010L < t_6 < 0.012L$$
$$0.032L < t_7 < 0.040L$$
$$0.019L < t_8 < 0.023L$$
$$0.011L < t_9 < 0.013L$$
$$0.013L < t_{10} < 0.017L$$

Absolute Values $1.717 < n_D$ (Element 88) $< 1.723$
$1.496 < n_D$ (Element 89) $< 1.500$
$1.515 < n_D$ (Element 90) $< 1.519$
$1.515 < n_D$ (Element 91) $< 1.519$
$1.717 < n_D$ (Element 92) $< 1.723$ $28.9 < \nu$ (Element 88) $< 29.7$
$66.0 < \nu$ (Element 89) $< 68.0$
$63.5 < \nu$ (Element 90) $< 65.5$
$63.5 < \nu$ (Element 91) $< 65.5$
$28.9 < \nu$ (Element 92) $< 29.7$ The specific optical constructional data for the preferred form of said variable focus optical system 30 are given in the table herebelow and in FIG. 10 of the drawing wherein $R_9$ to $R_{16}$ designate the successive lens refracting surfaces of the lenses 88 to 92, $t_6$ to $t_{10}$ designate the lens thicknesses therefor, and F, $n_D$ and $\nu$ have the meanings heretofore given in the specification.

VARIABLE FOCUS LENS SYSTEM 30

| Lens | Radii | Thicknesses | $n_D$ | $\nu$ |
|---|---|---|---|---|
| 88 | $R_9 = -0.823L$ | $t_6 = 0.012L$ | 1.720 | 29.3 |
| 89 | $R_{10} = 0.175L$ | | | |
| | $R_{11} = -0.175L$ | $t_7 = 0.036L$ | 1.498 | 67.0 |
| 90 | $R_{12} = 0.249L$ | | | |
| | $R_{13} = -0.304L$ | $t_8 = 0.021L$ | 1.517 | 64.5 |
| 91 | $R_{14} = -0.235L$ | $t_9 = 0.012L$ | 1.517 | 64.5 |
| 92 | $R_{15} = 0.075L$ | | | |
| | $R_{16} = 0.126L$ | $t_{10} = 0.015L$ | 1.720 | 29.3 |

The lens spacings $S_{10}$ through $S_{13}$ related to the variable focus optical system 30 are given in the table herebelow and in FIG. 11 of the drawing, the spaces $S_{10}$, $S_{12}$ and $S_{13}$ being variable and the numerical values thereof being given for progressive changes in the magnification of the image between 1.2× and 7.2×.

VALUES OF LENS SPACES RELATED TO LENS SYSTEM 3

| Magnification Factor | $S_{10}$ | $S_{11}$ | $S_{12}$ | $S_{13}$ |
|---|---|---|---|---|
| 1.2 | 0.143L | 0.0014L | 0.088L | 0.557L |
| 1.8 | 0.149L | 0.0014L | 0.164L | 0.475L |
| 2.0 | 0.136L | 0.0014L | 0.224L | 0.427L |
| 3.0 | 0.125L | 0.0014L | 0.274L | 0.389L |
| 3.6 | 0.116L | 0.0014L | 0.317L | 0.355L |
| 4.8 | 0.104L | 0.0014L | 0.389L | 0.295L |
| 7.2 | 0.088L | 0.0014L | 0.504L | 0.196L |

The above values are given in terms of L for various magnifications throughout the total range of magnification of 6.0.

The erector system

An erector system 34, by which the virtual image 31 is reversed and reverted, projects said image to a rearward stationary image plane 37 on axis portion 33. The erector system 34 primarily is comprised of the aforesaid two erector lenses 35 and 36. Both said lenses have positive power, and the foremost lens 35 is optically aligned on the third axis portion 27 and the rearmost erector lens 36 is optically aligned on the fourth axis portion 33, the focal length of the rearmost lens 36 being substantially 1.3× to 1.6× the focal length of the foremost lens 35 which has a focal length substantially equal to 0.930L. Said lenses are separated by an axial distance having a value between 0.630L and 0.770L, the preferred value being 0.700L. The image rays are deflected along the fourth axis portion 33 by the plane mirror 32 located at fixed point 28. Optically aligned on the fifth axis portion 41 is another erector lens 42 which is a substantial optical duplicate of lens 36 and is spaced away from the fixed point 28 by the same distance as lens 36 so that the erector system may be comprised of either lenses 35 and 36 or lenses 35 and 42 depending on which branch or branches of the optical system 10 is in use. Each of the erector lenses 35, 36 and 42 are compound and are composed of a front lens element "a" which is in contact with a rear element "b." The above-described mechanism is shown jointly in FIGS. 1 and 2.

The constructional data related to said erector lens system 34 are given in more detail in the tables herebelow wherein the successive lens surfaces $R_{17}$ to $R_{22}$ of the lens elements in the compound lenses 35 and 36 and the lens thicknesses $t_{11}$ to $t_{14}$ are given in terms of the quantity L along with the values of $n_D$ and $\nu$ of the glasses in said lenses.

ERECTOR LENS SYSTEM 34

Lens 35
$R_{17} > \pm 10.0L$ } Lens Element 35a
$0.485L < R_{18} < 0.593L$ }
$0.355L < -R_{19} < 0.433L$ } Lens Element 35b $0.014L < t_{11} < 0.018L$    Lens Element 35a
$0.030L < t_{13} < 0.036L$    Lens Element 35b $1.644 < n_D$ (35a) $< 1.654$
$1.512 < n_D$ (35b) $< 1.522$ } Absolute Values
$29.0 < \nu$ (35a) $< 39.0$
$60.0 < \nu$ (35b) $< 70.0$ Lens 36 and Lens 42
$1.931L < R_{20} < 2.361L$ } Lens Element 36a
$0.403L < -R_{21} < 0.493L$ }
$0.676L < -R_{23} < 0.826L$ } Lens Element 36b $0.021L < t_{13} < 0.025L$    Lens Element 36a
$0.018L < t_{14} < 0.022L$    Lens Element 36b $1.512 < n_D$ (36a) $< 1.522$
$1.715 < n_D$ (36b) $< 1.725$ } Absolute Values.
$60.0 < \nu$ (36a) $< 70.0$
$25.0 < \nu$ (36b) $< 35.0$ More specifically, the above-mentioned constructional data are given in the table of values herebelow wherein the symbolism remains the same as above.

| Lens Element | Radii | Thicknesses | $n_D$ | $\nu$ |
|---|---|---|---|---|
| 35a (front) | $R_{17}$=Plano | $t_{11}$=0.016L | 1.649 | 33.8 |
| | $R_{18}$=0.539L | | | |
| 35b (rear) | $R_{18}$=0.539L | $t_{12}$=0.033L | 1.517 | 64.5 |
| | $-R_{19}$=0.394L | | | |
| | $R_{20}$=2.146L | | | |
| 36a (front) | | $t_{13}$=0.023L | 1.517 | 64.5 |
| | $-R_{21}$=0.448L | | | |
| | $-R_{21}$=0.448L | | | |
| 36b (rear) | | $t_{14}$=0.020L | 1.720 | 29.3 |
| | $-R_{22}$=0.751L | | | |
| | $R_{23}$=2.146L | | | |
| 42a (front) | | $t_{15}$=0.023L | 1.517 | 64.5 |
| | $-R_{24}$=0.448L | | | |
| 42b (rear) | | $t_{16}$=0.020L | 1.720 | 29.3 |
| | $-R_{25}$=0.751L | | | |

The value of the equivalent focal length of lens 35 should lie between 0.838L and 1.024L, and ideally should be 0.931L as aforesaid while the value of the equivalent focal length of lenses 36 and 42 should lie between 1.204L and 1.472L and ideally should be 1.338L.

Means for viewing the image formed at the stationary image plane 87 is provided and said means includes an eyepiece member 37 which for purposes of simplicity has been shown with only one eye lens 93 although it is contemplated to incorporate binocular vision herein by use of a suitable beam divider mechanism generally designated by the numeral 94.

Up to this point only the basic combination is described, said basic combination being defined as a combination of the objective 13, the beam divider 17, the illumination system 56, the color compensating lens 24, field lens 29, the variable focus or magnification optical system 30, the erector lens system 34, and means such as the eyepiece 37 for viewing the image. Alternatively the basic combination may consist of other forms of objectives, illuminating systems, beam dividers, and compensating lenses as described heretofore. Various auxiliary devices which enter into larger combinations are described separately hereinafter.

*Phase contrast apparatus*

Referring back to the description of the illumination system, it will be found that a part of the phase contrast apparatus is there described, said part being an illuminating annulus plate 71 which has formed thereon a light diaphragming pattern of suitable configuration such as a transparent ring or annulus surrounded by opaque background. As already mentioned, the illuminating annulus plate 71 is positioned at a position which is conjugate to the exit pupil 64 of the objective 13 so that the illuminated area of the pupil is ring shaped. The illuminated portion of the specimen surface is projected by the objective 13, as shown in FIG. 1, through the beam divider 17, the compensating lens 24 or 24' and field lens 29 successively into the variable focus optical system 30. The front lens 40 forms a real image 95 of the exit pupil 64 within the variable power optical system 30 at the back focal plane of lens 40. In the plane of the exit pupil image 95, an annular phase plate 96 is positioned as shown by the dotted lines 96' which changes the phase of the incident light regardless of whether the light is polarized or scattered. When the rear lens 40' is in low power position the annular phase plate 96 cannot be introduced into the system by reason of the fact that the lens 40' moves through that position during its motion to effect focal changes. Therefore, the phase plate 96 is introduced into the system just after the lens 40' is moved past its intermediate magnification position of about 2.2× and is moved along axis 27 rearwardly thereafter to the full extent of its range. It will be noticed that the image 95 of the exit pupil 13 is always spaced at a constant distance 97 rearwardly of the front lens for all axial positions occupied during changes of magnification.

For all operative positions of the movable lenses 40 and 40' in the variable magnification lens system 30, the aforesaid virtual image 31 of the specimen plane remains stationary as described in the aforementioned Patent No. 3,170,984 so that the subsequent image formed at 87 in FIG. 2 by the erector lens system 34 will be stationary and may be viewed by the eyepiece 37.

A further novel combination of optical elements relates to the means by which the illumination annulus plate 71 is aligned optically and coaxially with the phase plate 96. For this purpose an inspection lens 98 of positive power is located between the erector lens 35 and the plane mirror 32. The lens 98 is focused on the phase plate 96 so that it serves to focus the superimposed images of the two phase cotnrast optical members 71 and 96 into the eyepiece focal plane 87 where the images may be seen for the purpose of mutually centering the complementary patterns on said members with each other. The lens 98 is preferably mounted for lateral movement into the optical system 10 but it does not remain in the optical system for any other purpose.

*The movable mirror unit*

A movable mirror unit which is diagrammatically indicated in dotted lines by numeral 100 supports the aforesaid totally reflecting second mirror 32 which is located at the second fixed point 28. Also supported in said mirror unit 100 is a semi-reflecting second beam divider 99 having its reflecting surface at the second fixed point 28 and being inclined oppositely to mirror 32 so as to reflect a part of the incident image rays along the axis extension 39 as shown in FIG. 1 for a purpose to be described. Part of said incident image rays are transmitted through the beam divider 99 along the fifth axis portion 41 toward the erector lens 42.

In order to permit the image rays which are emergent from lens 35 to pass undeflected at maximum brightness to the axis portion 41, a suitable aperture may be provided in the unit 100 for this purpose or the unit may be removed. That portion of the image rays which is projected by the erector lens 42 along the fifth axis portion 41 is totally reflected by a suitable removable mirror 44 located at a fixed axial point 43. From the mirror 44 the image rays are reflected horizontally along an axis portion 45 to a negative amplifier projection lens 46 which forms an enlarged image on the rear surface of the viewing screen 47 for the convenience of the observer seated at the eyepiece of the instrument. The amplifier lens is described more in detail and constructional data given therefor hereinafter.

Since the partially reflecting mirror 99 passes therethrough part of the rays which are incident thereon, these rays may be projected by a second amplifier projection lens 53, which is a substantial duplicate of lens 46, to the fixed point 49 where the plane mirror 51 is located to deflect the rays horizontally along the eighth axis portion 52. Said image rays are focused by the projection lens 53 to form an enlarged image at the aforesaid film plane 54 where a film holder and other suitable film support may be demountably held to receive the image transmitted through the optical system.

The aforesaid first and second amplifier projection lenses 46 and 53 respectively are compound lenses of negative meniscus form and are concave toward entrant light. Each lens 46 or 53 is composed as shown in FIG. 2 of a front double concave singlet lens element "*a*" which lies in edge contact with a second double concave lens element "*b*." On the rear surface of the second double concave element "*b*," a double convex lens element "*c*" is cemented to form a doublet. The equivalent focal length of said singlet lens "*a*" is substantially —0.141L and the focal length of said doublet is substantially —0.970L which combine to provide a complete amplifier lens having an equivalent focal length of substantially —0.127L.

The constructional data for said amplifier projection lenses 46 and 53 are given heretofore in the table in column 4.

More specifically, the values of the constructional data for lenses 46 and 53 are given in the table herebelow.

| | | | $n_D$ | $\nu$ |
|---|---|---|---|---|
| Elem. 46a | $\begin{cases} -R_{26}=0.154L \\ R_{27}=0.154L \end{cases}$ | $t_{17}=0.0107L$ | 1.541 | 59.9 |
| Elem. 46b | $\begin{cases} -R_{28}=0.111L \\ R_{29}=0.253L \end{cases}$ | $t_{18}=0.0107L$ | 1.541 | 59.9 |
| Elem. 46c | $\begin{cases} \\ -R_{30}=0.253L \end{cases}$ | $t_{19}=0.0279L$ | 1.720 | 29.3 |

The axial distance as aforesaid between lens 42 and either of lenses 46 or 53 lies between 1.058L and 1.294L, and the axial distance from the amplifier lens 46 to the screen 47 lies between 0.984L and 1.202L and preferably should be 1.093L which is the same as the axial distance from the lens 53 to the film plane 54.

To assist in photographically recording the image, a photoelectric device 38 of suitable properties is aligned on the rearwardly extended axis 39 as aforesaid to receive a small portion of the actinic rays which would affect the photographic plate or other photographic element. As shown in FIG. 1, said actinic rays are focused by a collective lens 101 so that the rays pass through a suitable diaphragm 102 and a filter plate 103 before the image rays impinge upon the photoelectric cell 38′. As shown in the drawing, the photoelectric cell 38′ is connected into an electrical circuit and meter device generally designated by the numeral 105 so that the photoelectric response of said cell is indicated.

For use in connection with the photoelectric cell 38′ a suitable shutter mechanism 106 is provided which is aligned on the fifth axis portion 41 between the erector lens 42 and the mirror 44. Said shutter mechanism is provided with a regulating device 107 whereby the actinic response of the photoelectric cell 38′ may be sensed or a value corresponding to the actinic response may be used in manually setting the automatic timer of the shutter mechanism 108 for closing the shutter.

Also used alternatively with the plane mirror 32 is an aperture plate which allows the image rays to pass therethrough along the third and fifth axis portions 27 and 41 respectively so that the eyepiece and the photoelectric cell are both cut out and removed as an active part of the optical system 10. In this condition of use, the microscope optical system provides the viewing screen 47 as the prime means for viewing the image.

To further elucidate the operation of the microscope 10, a ray trace for the axial ray 109 and principal ray 110 is shown in FIGS. 1, 2 and 3 wherein the manner in which said rays are affected by the successive optical elements is graphically shown.

*Stereoviewing mechanism*

For the purpose of viewing the specimen or object 12 stereoscopically, the optical system 10 is modified as shown in FIG. 12 whereby polarization techniques are used for this effect.

To this end, a two-part stereo polarization plate 112 is introduced when desired into said lens system in optical alignment with the objective 13, said plate being axially located substantially in the plane of the relayed image 95 of the exit pupil 64 of the objective. The stereo polarization plate 112 is composed of two complementary half disks 113 and 114 of light polarizing material, the two parts being butted together and arranged with the plane of vibration of one part being directed normal to the plane of vibration of the other part.

The oppositely polarized semicircular portions 113 and 114 of the plate or disk 112 are individually aligned optically respectively with the analyzer plates 115 and 116 which are also mutually oppositely polarized, one of the analyzer plates being located as shown in FIG. 12 in front of each eye lens 93 of the binocular eyepiece 94, the planes of polarization of the analyzer plates 115 and 116 being oriented to transmit the rays which are passed by the respectively optically aligned halves 113 and 114 of the polarization plate 112. It will be understood that the stereo polarization plate 112 may in some instances be located either in the exit pupil 64 of the objective 13 or at any related pupil other than the described relayed pupil 95, and located ahead of the binocular eyepiece 94.

In any case, the right and left eye of the observer see a pair of stereo images formed by viewing the specimen at different angles so that considerable depth effect is observed in said image.

From the foregoing, it will be seen that this invention provides new combinations of apparatus for a metallographic type of microscope which is easily convertible to any of a number of diversified metallurgical investigations in an expeditious manner, the image of the specimen being seen and/or photographed by the use of a plurality of combinations of apparatus, said image being well corrected especially for lateral color aberrations as well as monochromatic image aberrations, distortion and field curvature resulting in excellent optical performance.

Although only certain forms of the present invention have been shown and described in detail, other forms and arrangements are possible and changes may be made in the details of component parts and substitutions may be made therein without departing from the spirit of the invention as defined in the appended claims.

We claim:

1. An optical system for an inverted microscope comprising:
   an objective aligned on a vertical portion of the optical axis of said system in a position below a stage which holds a specimen whereon the objective is focused,
   means including a beam divider optically aligned on said vertical portion below said objective for illuminating said specimen episcopically through said objective,
   said beam divider being so constructed as to direct the image rays which are reflected from the specimen downwardly and rearwardly therefrom along a second portion of axis to a fixed point,
   a plane mirror located at said point and so inclined to said second portion as to direct image rays upwardly and rearwardly away from the stage along a third portion of axis to a second fixed point thereon,
   a second plane mirror and a second beam divider which are connected together for movement alternatively into coincidence with said second fixed point, said mirror and divider being arranged in mutually crossed positions so that said second mirror deflects image rays along a fourth portion of axis toward said stage and said divider directs a part of said rays from said second point in a direction oppositely to the rays deflected by the second mirror and directs another part of said rays through the divider along a fifth axis portion in substantial alignment with said third axis portion,
   a continuously variable magnification type of lens system operatively and optically aligned on said third axis portion for relaying the image formed by the objective to a stationary image plane formed on said fourth axis portion when either said mirror or the second beam divider is in operative position,
   an eyepiece focused upon said stationary image for viewing the image formed thereat,
   a photoresponsive recording device operatively aligned to receive said third beam and indicate the strength thereof,
   an exposure regulating shutter aligned on said fifth axis portion, and being adjustable in accordance with the response of said device, a photographic plate optically aligned with said shutter at an image plane which is conjugate to the aforesaid stationary image plane, reflection means located on said fifth axis portion beyound said shutter and so inclined as to direct rays incident thereon forwardly over said stage along a sixth axis portion, a viewing screen located above said eyepiece at an image plane conjugate to said stationary image plane along said sixth axis portion, and an erector lens system operatively constructed and arranged to provide an erect image in the image plane of said eyepiece and in the plane of the viewing screen, said erector lens system comprising a first positive lens located on said third axis portion at a fixed distance from said second fixed point, and further comprising second and third positive lenses which are of the same optical construction as the first positive lens and are located on the fourth and fifth axis portions respectively at the same distance from said second fixed point.

2. An optical system for an inverted miscroscope comprising an objective located beneath a stage on a vertical portion of the optical axis of said system and focused upon a specimen on said stage, a beam divider aligned beneath the objective on said vertical axis portion and constructed to direct illumination rays from a light source aligned therewith upwardly therefrom through said objective and thereafter deflect the image rays which are reflected from the specimen downwardly and rearwardly along a second portion of said optical axis to a fixed point thereon, a mirror located at said point and so inclined to the second axis portion as to direct image rays upwardly therefrom and rearwardly of the stage along a third axis portion to a second fixed point, lens means including a doublet field lens located in a fixed axial position on said third axis portion and being so constructed and arranged as to introduce substantially parallel principal rays into subsequent lenses, a continuously variable magnification optical system which is optically aligned on said third axis portion rearwardly of said field lens so as to receive image rays therefrom and form a subsequent substantially stationary image of continuously variable magnification, said variable magnification system being characterized by a fixed positive and a rear negative movable lens component, a mirror located at a fixed point on said third axis portion upwardly from said variable magnification optical system and being inclined to direct the image rays from said third to a fourth portion of axis extending toward said stage, an erector lens system operatively aligned rearwardly of said continuously variable magnification system so as to form in the eyepiece image plane an erect image, an eyepiece located on said fourth portion of axis extending over said stage and focused at said stationary image plane, an illumination system comprising said light source, an illumination annulus plate optically aligned in said illumination system at the aperture stop thereof so as to provide a prescribed pattern of illuminating rays which fall upon the specimen, and a phase retardation plate located substantially at the exit pupil of said front lens of the variable magnification optical system, said plate being spaced at a constant distance from said front lens and being movable therewith to maintain its position substantially at said exit pupil whereby phase contrast effects may be achieved for a wide range of magnification of the image produced by said variable magnification optical system.

3. An optical system for an inverted microscope as set forth in claim 2 and further comprising an auxiliary focusing lens of positive power which is alignable on said third axis portion between the first erector lens and said second fixed point, said lens being focused on said retardation phase plate so as to form an image thereof at said eyepiece focal plane to indicate the axial alignment of the annulus plate with the phase plate.

4. An optical system for a metallurgical microscope comprising a microscope objective arranged with its optical axis vertically positioned beneath a stage whereon a specimen is held at the focus of the objective, a beam divider optically aligned on said axis below said objective and having an entrance surface thereon through which illumination rays are projected along said axis to said specimen from a light source which is optically aligned with said axis, said beam divider having a reflecting surface which is inclined to said axis so as to direct image rays coming from said specimen rearwardly and downwardly of said beam divider along a second optical axis portion to a fixed point thereon, a lateral color compensating lens located on said second axis portion and having an equivalent focal length which has a value of substantially .393 L and is axially located at a distance 0.900L from the shoulder whereon said objective is seated wherein L represents the axial distance from said shoulder to a stationary image plane formed jointly by said objective and color compensating lens on said second axis portion, said lens having a lateral color compensating aberration which is opposed to and substantially compensates the residual lateral chromatism of said optical system, a reticle plate having a comparison pattern formed thereon and located at said image plane, a plane mirror having its reflective surface intersecting said fixed point and inclined to said second axis portion so as to direct said rays upwardly along a third axis portion which is rearwardly inclined, a negative doublet field lens located at a fixed optical distance rearwardly from said compensating lens and cooperating therewith to project said principal rays rearwardly thereof in a substantially parallel condition, said field lens having a value of equivalent focal length of substantially —0.233L and said optical distance having a value of substantially 0.433L, a continuously variable focus optical system which is optically aligned on said third axis portion rearwardly of said field lens, said variable focus system being composed of a front lens member and a rear lens member spaced therefrom having respectively positive and negative power, said members being moved differentially with respect to said field lens so as to form a stationary virtual image in the space toward the field lens therefrom, the equivalent focal length of the positive member being numerically substantially 1.1 times the equivalent focal length of the negative member, said positive member being composed of a front double concave lens element and a mutually contacting double convex lens element in fixed spaced relation to a rearward double convex lens element, said negative member being composed of a front double concave lens element in contact with a rear meniscus lens element, the constructional data for said system being set forth in the chart of values herebelow wherein the successive lens elements numbered from the entrant side are designated by numerals 88 to 92, the successive radii are represented by $R_9$ to $R_{16}$, the successive thicknesses are designated $t_6$ to $t_{10}$, and $n_D$ and $v$ represent respectively the refractive index and the Abbé number for the lens materials,

| Lens | Radii | Thicknesses | $n_D$ | $\nu$ |
|---|---|---|---|---|
| 88 | $R_9 = 0.823L$ | $t_6 = 0.012L$ | 1.720 | 29.3 |
| 89 | $R_{10} = 0.175L$ $R_{11} = -0.175L$ | $t_7 = 0.036L$ | 1.498 | 67.0 |
| 90 | $R_{12} = 0.249L$ $R_{13} = 0.304L$ | $t_8 = 0.021L$ | 1.517 | 64.5 |
| 91 | $R_{14} = -0.235L$ | $t_9 = 0.012L$ | 1.517 | 64.5 |
| 92 | $R_{15} = 0.075L$ $R_{16} = 0.126L$ | $t_{10} = 0.015L$ | 1.720 | 29.3 | the lens spacings which are designated $S_{10}$ and $S_{13}$ are related to the variable focus optical system being given in the table herebelow, the values thereof being given for progressive selected values of magnification comprised in the total magnification range of substantially 5× to 30×,

| Magnification Factor | $S_{10}$ | $S_{11}$ | $S_{12}$ | $S_{13}$ |
|---|---|---|---|---|
| 1.2 | 0.143L | 0.0014L | 0.088L | 0.557L |
| 1.8 | 0.149L | 0.0014L | 0.164L | 0.475L |
| 2.0 | 0.136L | 0.0014L | 0.224L | 0.427L |
| 3.0 | 0.125L | 0.0014L | 0.274L | 0.389L |
| 3.6 | 0.116L | 0.0014L | 0.317L | 0.355L |
| 4.8 | 0.104L | 0.0014L | 0.389L | 0.295L |
| 7.2 | 0.088L | 0.0014L | 0.504L | 0.196L | wherein the lens space $S_{10}$ extends from said field lens to lens 88 and space $S_{13}$ extends from lens 92 to the next adjacent fixed lens, an erector lens system including a fixed lens located partly on said third axis portion for erecting said image, and means optically aligned with said erector lens system for viewing the image formed thereby.

5. An optical system for a metallurgical microscope comprising a microscope objective arranged with its optical axis vertically positioned beneath a stage whereon a specimen is held at the focus of the objective, a beam divider optically aligned on said axis below said objective and having an entrance surface thereon through which illumination rays are projected along said axis to said specimen from a light source which is optically aligned with said axis, said beam divider having a reflecting surface which is inclined to said axis so as to direct image rays coming from said speicmen rearwardly and downwardly of said beam divider along a second optical axis portion to a fixed point thereon, a lateral color compensating lens located on said second axis portion and having an equivalent focal length which has a value of substantially .393L and is axially located at a distance 0.900L from the shoulder whereon said objective is seated wherein L represents the axial distance from said shoulder to a stationary image plane formed jointly by said objective and color compensating lens on said second axis portion, said lens having a lateral color compensating aberration which is opposed to and substantially compensates the residual lateral chromatism of said optical system, a reticle plate having a comparison pattern formed thereon and located at said image plane, a plane mirror having its reflective surface intersecting said fixed point and inclined to said second axis portion so as to direct said rays upwardly along a third axis portion which is rearwardly inclined, a negative doublet field lens located at a fixed optical distance rearwardly from said compensating lens and cooperating therewith to project said principal rays rearwardly thereof in a substantially parallel condition, said field lens having a value of equivalent focal length of substantially $-0.233L$ and said optical distance having a value of substantially 0.433L, a continuously variable focus optical system which is optically aligned on said third axis portion rearwardly of said field lens, said variable focus system being composed of a front lens member and a rear lens member spaced therefrom having respectively positive and negative power, said members being moved differentially with respect to said field lens so as to form a stationary virtual image in the space toward the field lens therefrom, the equivalent focal length of the positive member being numerically substantially 1.1 times the equivalent focal length of the negative member, said positive member being composed of a front double concave lens element and a mutually contacting double convex lens element in fixed spaced relation to a rearward double convex lens element, said negative member being composed of a front double concave lens element in contact with a rear meniscus lens element, the constructional data for said system being set forth in the chart of values herebelow wherein the successive lens elements numbered from the entrant side are designated by numerals 88 to 92, the successive radii are represented by $R_9$ to $R_{16}$, the successive thicknesses are designated $t_6$ to $t_{10}$, and $n_D$ and $\nu$ represent respectively the refractive index and Abbé number for the lens materials,

| Lens | Radii | Thicknesses | $n_D$ | $\nu$ |
|---|---|---|---|---|
| 88 | $R_9 = .823L$ | $t_6 = 0.012L$ | 1.720 | 29.3 |
| 89 | $R_{10} = 0.175L$ $R_{11} = -0.175L$ | $t_7 = 0.036L$ | 1.498 | 67.0 |
| 90 | $R_{12} = 0.249L$ $R_{13} = -0.304L$ | $t_8 = 0.021L$ | 1.517 | 64.5 |
| 91 | $R_{14} = -0.235L$ | $t_9 = 0.012L$ | 1.517 | 64.5 |
| 92 | $R_{15} = 0.075L$ $R_{16} = 0.126L$ | $t_{10} = 0.015L$ | 1.720 | 29.3 | the lens spacings which are designated $S_{10}$ and $S_{13}$ are related to the variable focus optical system being given in the table herebelow, the values thereof being given for progressive selected values of magnification comprised in the total magnification range of substantially 5× to 30×,

| Magnification Factor | $S_{10}$ | $S_{11}$ | $S_{12}$ | $S_{13}$ |
|---|---|---|---|---|
| 1.2 | 0.143L | 0.0014L | 0.088L | 0.557L |
| 1.8 | 0.149L | 0.0014L | 0.164L | 0.475L |
| 2.0 | 0.136L | 0.0014L | 0.224L | 0.427L |
| 3.0 | 0.125L | 0.0014L | 0.274L | 0.389L |
| 3.6 | 0.116L | 0.0014L | 0.317L | 0.355L |
| 4.8 | 0.104L | 0.0014L | 0.389L | 0.295L |
| 7.2 | 0.088L | 0.0014L | 0.504L | 0.196L | wherein the lens space $S_{10}$ extends from said field lens to lens 88 and space $S_{13}$ extends from lens 92 to the next adjacent fixed lens, an erector lens system characterized by a front fixed lens member located on said third axis portion and a rear lens member which is optically aligned therewith on a fifth axis portion which is coextensive with said third axis portion, the front and rear lens members having positive equivalent focal length respectively of substantially .931L and 1.338L and being spaced from each other by an axial distance of substantially 0.700L, and means optically aligned with said erector lens system for viewing the image formed thereby.

6. An optical system as set forth in claim 5 wherein said erector lens member is composed of a front and a rear lens element cemented together, the front surface radius being designated $R_{17}$ and being plano, the radius of the cemented interface being designated $R_{18}$ and having a value of substantially 0.539L, and the radius of the rear surface being designated $-R_{19}$ and having a value of substantially 0.394L, the rear erector lens member being composed of a double convex front lens cemented to a rear convex-concave lens element, the front surface of the rear member being designated $R_{20}$ and having a radius value of substantially 2.146L, a cemented interface designated $-R_{21}$ having a value of substantially 0.448L, and a rear surface designated $-R_{22}$ having a value of substantially 0.751L wherein the minus (—) sign designates lens surfaces which are concave toward the entrance side of the erector member and L designates the axial distance between the shoulder on which the objective is seated and said stationary image plane.

7. The combination in an optical system for an inverted miscroscope of a microscope objective located on a vertical axis portion of the optical axis of said system beneath a stage on which a specimen is held so that the objective is focused thereon, a beam divider aligned on said vertical axis portion and arranged and constructed so as to direct the image rays which are reflected from said specimen along a second portion of said axis extending rearwardly and downwardly of said beam divider to a fixed point on the second portion, a first mirror held inclined to said second portion at said point so as to deflect said optical axis obliquely upwardly along a third portion of axis to a second fixed point located thereon, a continuously variable magnification optical system axially aligned on said third portion of axis in a position to receive said image rays and form therefrom an image of variable magnification at a substantially stationary image plane forwardly of said second point, a second mirror located at said second fixed point and inclined to the third axis portion so as to deviate the image rays along a fourth portion of axis toward said stage, a subsequent image plane formed by said optical system on said fourth portion of axis, means optically aligned with said erector lens system for viewing the image formed thereby, an erector lens system having two positive lenses spaced from each other and located individually on each of the third and fourth portions of axis, said combination further including a lateral color compensating lens aligned on said second axis portion and with said objective cooperatively forming a first stationary image plane substantially free from the lateral color produced by the optical system, the axial distance between the shoulder whereon said objective is seated and said first stationary image plane having a value of substantially .900F where F represents the focal length of said objective per se, said color compensating lens being the sole means for compensating the residual lateral color aberration of said system.

8. The combination in an optical system for an inverted microscope of a microscope objective located on a vertical axis portion of the optical axis of said system beneath a stage on which a specimen is held so that the objective is focused thereon, a beam divider aligned on said vertical axis portion and arranged and constructed so as to direct the image rays which are reflected from said specimen along a second portion of said axis extending rearwardly and downwardly of said beam divider to a fixed point on the second portion, a first mirror held inclined to said second portion at said point so as to deflect said optical axis obliquely upwardly along a third portion of axis to a second fixed point located thereon, a continuously variable magnification optical system axially aligned on said third portion of axis in a position to receive said image rays and form therefrom an image of variable magnification at a substantially stationary image plane forwardly of said second point, a second mirror located at said second fixed point and inclined to the third axis portion so as to deviate the image rays along a fourth portion of axis toward said stage, a subsequent image plane formed by said optical system on said fourth portion of axis, means optically aligned with said erector lens system for viewing the image formed thereby, an erector lens system having two positive lenses spaced from each other and located individually on each of the third and fourth portions of axis to erect said image, said combination further including a lateral color compensating lens aligned on said second axis portion and with said objective cooperatively forming a first stationary image at said plane which compensates the lateral color produced by the optical system, the axial distance between the shoulder whereon said objective is seated and said first stationary image plane having a value of substantially .900F where F represents the focal length of said objective per se, said color compensating lens being the sole means for compensating the residual lateral color aberration of said system, said color compensating lens comprising a singlet positive lens having constructional data as given in the table herebelow in terms of L representing the axial distance between the shoulder whereon said objective is seated and the aforesaid first stationary image plane, E.F. represents the equivalent focal length of said lens, $R_1$ and $R_2$ denote the successive radii of the lens surfaces numbering from the objective side and the minus (—) sign designates those lens surfaces which are concave toward said objective, $t_1$ represents the axial thickness of said lens, and $n_D$ and $\nu$ represent the refractive index and Abbé-number respectively of lens materials, $$E.F. = 0.393L$$
$$R_1 = 0.196L$$
$$R_2 = \text{Plano}$$
$$t_1 = 0.028L$$
$$n_D = 1.498$$
$$\nu = 67.0$$

9. The combination in an optical system for a microscope of a stage on which a specimen is held, an objective mounted adjacent to said stage in optical alignment with and focused on said specimen, an illuminating system for illuminating said specimen including an annular ring located at the aperture stop of the illuminating system and further including means for projecting an image of said ring at the entrance pupil of said objective, leans means including a negative field lens optically aligned with said objective rearwardly of the image formed by the objective, said field lens being so constructed as to direct the principal exit rays therefrom substantially parallel to the axis of the field lens, a continuously variable magnification lens system optically aligned rearwardly adjacent to said field lens and constructed to form a substantially stationary image of variable size, said variable magnification lens system being characterized by a front positive lens component and a rear negative lens component, both of which are movable axially relative to a fixed point on the axis of said system so as to produce said image, an eyepiece optically aligned for viewing said image, and a movable phase retardation plate corresponding in shape to said annular ring and located in axial alignment with said front positive component at a constant axial distance rearwardly thereof in substantial coincidence with the exit pupil formed by said positive component at least during a major portion of the axial movement thereof whereby phase contrast effects may be obtained in the field of view through a given range of magnification of said image.

References Cited

UNITED STATES PATENTS

| | | | |
|---|---|---|---|
| 2,209,532 | 7/1940 | Michel | 350—9 |
| 2,660,923 | 12/1953 | Benford | 350—13 |
| 2,861,498 | 11/1958 | Klein | 350—13 |
| 2,893,289 | 7/1959 | Edgerton | 350—87 |
| 3,030,861 | 4/1962 | Mortimer et al. | 350—184 |
| 3,170,984 | 2/1965 | Rosenberger et al. | 350—184 |
| 3,202,047 | 8/1965 | Lawler | 350—91 X |

DAVID SCHONBERG, *Primary Examiner.*

T. H. KUSMER, *Assistant Examiner.*

U.S. Cl. X.R.

350—10, 13, 19, 34, 35, 42, 54, 89, 184

PO-1050
(5/69)

UNITED STATES PATENT OFFICE
CERTIFICATE OF CORRECTION

Patent No. 3,437,395   Dated   April 8, 1969

Inventor(s)   Harold E. Rosenberger and Sarkis K. Tchejeyan

It is certified that error appears in the above-identified patent and that said Letters Patent are hereby corrected as shown below:

Column 10, line 62, change "$t_{13}$" to -- $t_{12}$ --;

line 69, change "$0.676 \angle -R_{23}$" to --$0.676L \angle -R_{22}$--;

Column 17, line 11, change "$0.304L$" to -- $-0.304L$ --

SIGNED AND
SEALED

SEP 30 1969

(SEAL)
Attest:

Edward M. Fletcher, Jr.
Attesting Officer

WILLIAM E. SCHUYLER, JR.
Commissioner of Patents